US010440887B2

(12) United States Patent
Goering et al.

(10) Patent No.: US 10,440,887 B2
(45) Date of Patent: Oct. 15, 2019

(54) DOFFER FOR A COTTON CLEANER (71) Applicant: Deere & Company, Moline, IL (US)

(72) Inventors: Kevin J. Goering, Cambridge, IA (US); John O. Rumohr, Pleasant Hill, IA (US)

(73) Assignee: Deere & Company, Moline, IL (US)

( * ) Notice: Subject to any disclaimer, the term of this patent is extended or adjusted under 35 U.S.C. 154(b) by 134 days.

(21) Appl. No.: 15/684,586

(22) Filed: Aug. 23, 2017

(65) Prior Publication Data
US 2017/0347525 A1 Dec. 7, 2017

Related U.S. Application Data (63) Continuation-in-part of application No. 14/824,604, filed on Aug. 12, 2015, now Pat. No. 9,763,387.

(51) Int. Cl.
*A01D 46/08* (2006.01)
*A01D 91/04* (2006.01)

(52) U.S. Cl.
CPC .............. *A01D 46/08* (2013.01); *A01D 91/04* (2013.01)

(58) Field of Classification Search
CPC ........ A01D 46/08; A01D 91/04; A01D 46/12; B65H 75/22; B65H 2701/51526; B65H 2701/5114; B65H 75/14
See application file for complete search history.

(56) References Cited

U.S. PATENT DOCUMENTS

| | | | | | |
|---|---|---|---|---|---|
| 3,940,085 | A | * | 2/1976 | Campbell | B65H 75/22 242/609.2 |
| 4,606,177 | A | * | 8/1986 | Schlueter | A01D 46/08 19/64.5 |
| 5,575,437 | A | * | 11/1996 | Campbell | B65H 75/22 242/608.6 |
| 5,638,887 | A | * | 6/1997 | Didion | B02C 17/22 164/269 |
| 5,806,788 | A | * | 9/1998 | Witwer | B65H 75/22 242/118.6 |
| 6,159,094 | A | * | 12/2000 | Deutsch | A01D 46/08 460/98 |
| 6,273,176 | B1 | * | 8/2001 | Didion | B22D 31/007 164/131 |
| 8,424,796 | B2 | * | 4/2013 | Witwer | B65H 75/22 242/118.6 |

(Continued)

*Primary Examiner* — Arpad Fabian-Kovacs (57) ABSTRACT

A cotton doffer structure for doffing cotton snagged on a surface having debris. The cotton doffer structure comprises a plurality of single-piece extrusions cooperating to provide a rim. The rim has a longitudinal axis and a periphery with radial protrusions integrally extending outward from the periphery. A shaft is coupled to the rim for rotation therewith about the longitudinal axis in a forward direction and surrounded by the rim. Brushes are provided. Each brush has a base end supporting upstanding bristles, an opposing distal end, a leading side generally facing the forward direction, and an opposing trailing side. Each support member is provided that has a leading end and a trailing end with an upright flange. The brush support member secures a responsive one of the base ends of the plurality of brushes against a respective one of the radial protrusions with the upright flange located adjacent the leading side.

22 Claims, 11 Drawing Sheets (56) References Cited

U.S. PATENT DOCUMENTS

| | | | |
|---|---|---|---|
| 2002/0023729 A1* | 2/2002 | Didion | B22D 31/007 164/269 |
| 2002/0053625 A1* | 5/2002 | Charlton | B65H 75/22 242/608.5 |
| 2002/0069632 A1* | 6/2002 | Goering | A01D 46/08 56/28 |
| 2007/0262192 A1* | 11/2007 | Derendal | B65H 75/14 242/608.5 |
| 2008/0245920 A1* | 10/2008 | Houen | B65H 75/22 242/407.1 |
| 2011/0143899 A1* | 6/2011 | Wirth | A01D 46/12 492/45 |

* cited by examiner

DOFFER FOR A COTTON CLEANER

RELATED APPLICATIONS

This is a continuation-in-part of U.S. application Ser. No. 14/824,604, titled DOFFER FOR A COTTON CLEANER, filed on Aug. 12, 2015, which is hereby incorporated by reference in its entirety.

FIELD OF THE DISCLOSURE

The present disclosure generally relates to cotton cleaners of a cotton harvester, and more particularly to a doffer of a cotton cleaner.

BACKGROUND OF THE DISCLOSURE

Some cotton harvesters, such as the type shown in U.S. Pat. No. 4,606,177 assigned to Deere & Company, include a cotton cleaner for separating seed cotton from trash. The cleaner includes primary and reclaimer saw drums, each having numerous saw tooth discs incrementally spaced along a transverse driven shaft. Seed cotton and trash enter the cleaner and are propelled through a narrow longitudinal opening defined by the outer diameter of the drum, two end walls of the cleaner housing, and a lay-down bar. The lay-down bar presses the cotton upon the rotating saw teeth of the primary drum. As the primary drum rotates at high speed, the saw teeth snag the uncleaned cotton and force it through the narrow opening. The snagged cotton is impelled against several radially spaced bars to further enhance the separation of the trash from the seed cotton. The reclaimer drum snags cotton that gets by the primary drum. A doffer with brushes is rotated at a speed greater than the speed of the primary and reclaimer drums against the tooth discs to dislodge the snagged cotton and propel it towards a conveying duct.

SUMMARY OF THE DISCLOSURE

According to an aspect of the present disclosure, a cotton doffer structure for doffing cotton snagged on a surface having debris is disclosed. The cotton doffer structure comprises a plurality of single-piece extrusions. The single-piece extrusions cooperate to provide a rim which has a longitudinal axis and a periphery with a plurality of radial protrusions integrally extending outward from the periphery. A shaft is coupled to the rim for rotation therewith about the longitudinal axis in a forward direction and surrounded by the rim. A plurality of brushes are provided. Each brush has a base end supporting upstanding bristles, an opposing distal end, a leading side generally facing the forward direction, and an opposing trailing side. A plurality of brush support members are provided, each of which comprises a leading end and a trailing end with an upright flange. Each of the plurality of brush support member secures the base ends of the plurality of brushes against a respective one of the plurality of radial protrusions with the upright flange located adjacent the leading side.

According to another aspect of the present disclosure, a cotton doffer structure for doffing cotton snagged on a surface having debris is disclosed. The cotton doffer structure comprises a plurality of single-piece extrusions. The single-piece extrusions cooperate to provide a rim which has a longitudinal axis and a periphery with a plurality of radial protrusions integrally extending outward from the periphery forming a plurality of dovetail-shaped recesses. A shaft is coupled to the rim for rotation therewith about the longitudinal axis in a forward direction and surrounded by the rim. A plurality of brushes are provided. Each brush has a dovetail-shaped base end supporting upstanding bristles that is respectively received by one of the dovetail-shaped recesses, an opposing distal end, a leading side generally facing the forward direction, and an opposing trailing side. A plurality of brush support members are provided, each of which comprises a leading end and a trailing end with an upright flange located adjacent the leading side.

According to yet another aspect of the present disclosure, a method for assembling a cotton doffer structure that doffs cotton snagged on a surface having debris is disclosed. The method comprises coupling a plurality of single-piece extrusions to provide a rim. Each of the single-piece extrusions comprises a portion of the rim and a plurality of radial protrusions integrally extending outward from the portion of the rim. A shaft is coupled to the rim for rotation. A plurality of brushes are provided, each of which comprises a base end supporting upstanding bristles. The base ends of the plurality of brushes are secured with a plurality of brush support members comprising a leading end and a trailing end with an upright flange. Each of the plurality of brush support members secures a respective one of the base ends of the plurality of brushes against a respective one of the plurality of radial protrusions with the upright flange located adjacent the respective one of the base ends of the plurality of brushes.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
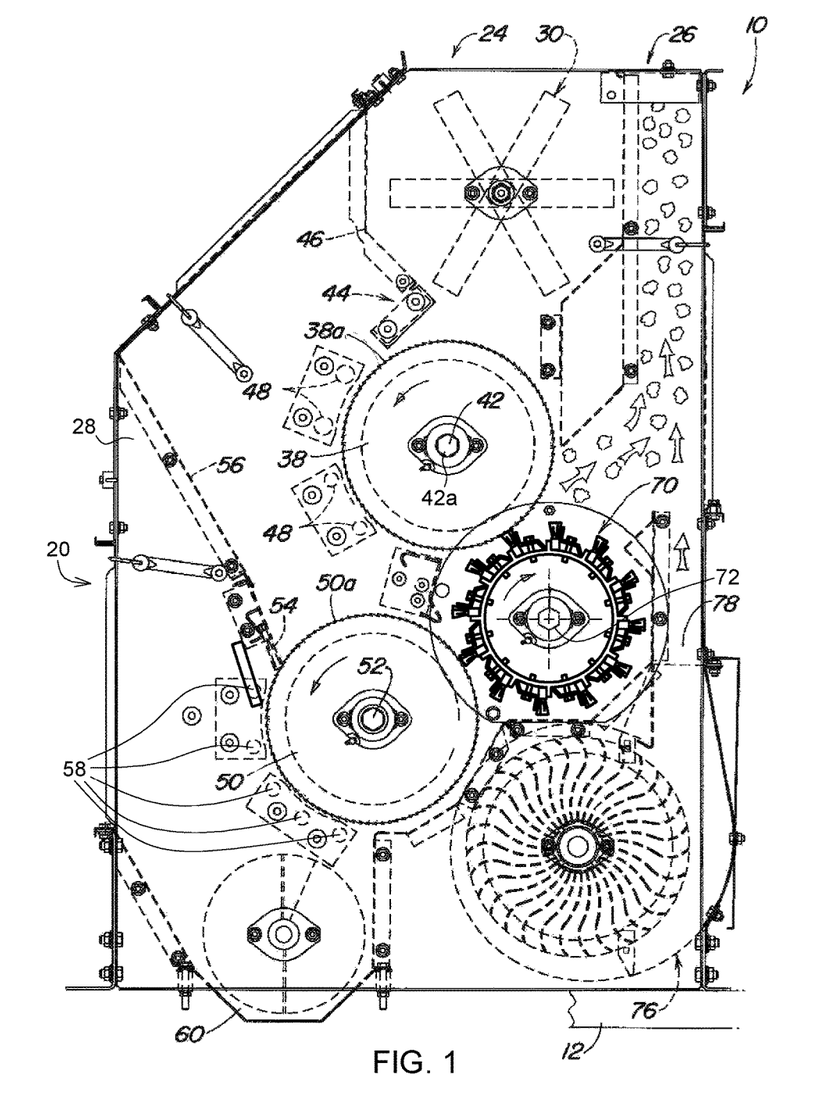
FIG. 1 is a left-hand side elevation view of a cotton cleaner partially broken away.

FIG. 1 illustrates a cotton cleaner 10 supported on a frame 12 of a cotton harvester such as a cotton stripper (not shown) which is generally of the type shown and described in the aforementioned U.S. Pat. No. 4,606,177. With the exception of doffer structure described in detail below, the cleaner 10 is also generally of the same type of construction as that shown and described in the patent. The cleaner 10 includes an upright housing 20 having an inlet portion 24 opening downwardly into the top of the cleaner 10, an outlet duct 26 leading upwardly to the structure for directing cleaned cotton into an accumulator and then to a baler or basket (not shown) on the frame 12, and sidewalls 28. The inlet portion 24 distributes material uniformly across the width of the cleaner 10 onto a feeder shaft 30 extending between sidewalls 28 of the cleaner. A primary saw cylinder or drum 38 is supported for rotation about an axis 42a below and parallel to the feeder shaft 30 by a shaft 42 extending between the cleaner sidewalls 28. A lay-down bar assembly 44 is supported adjacent a lower edge of a panel 46 between the sidewalls 28. The lay-down bar assembly 44 is located adjacent the forward upper quadrant of a toothed periphery 38a of the primary saw cylinder 38 and urges harvested material against the toothed periphery 38a. Grid bars 48 are offset radially from the drum 38 below the assembly 44. As the primary saw cylinder 38 is rotated at a high speed, cotton is snagged by the toothed periphery 38a and is forced through the narrow opening defined between the assembly 44 and the toothed periphery 38a. The snagged cotton is impelled against the bars 48 to separate the trash from the cotton.

A reclaimer saw cylinder or drum 50 similar in structure and operation to the primary saw cylinder 38 is supported for rotation by a shaft 52 parallel to the shaft 42. The reclaimer saw cylinder 50 is located below and slightly forwardly of the primary saw cylinder 38. A brush assembly 54 is supported adjacent the upper forward quadrant of the reclaimer saw cylinder 50 at the lower edge of a sloped panel 56 and brushes cotton lint against a toothed periphery 50a. Grid bars 58 similar to the grid bars 48 are supported adjacent the periphery 50a to separate trash from cotton lint. The separated trash and foreign objects fall to an auger assembly 60 which conveys the separated material out of the cleaner 10.

Figure 2:
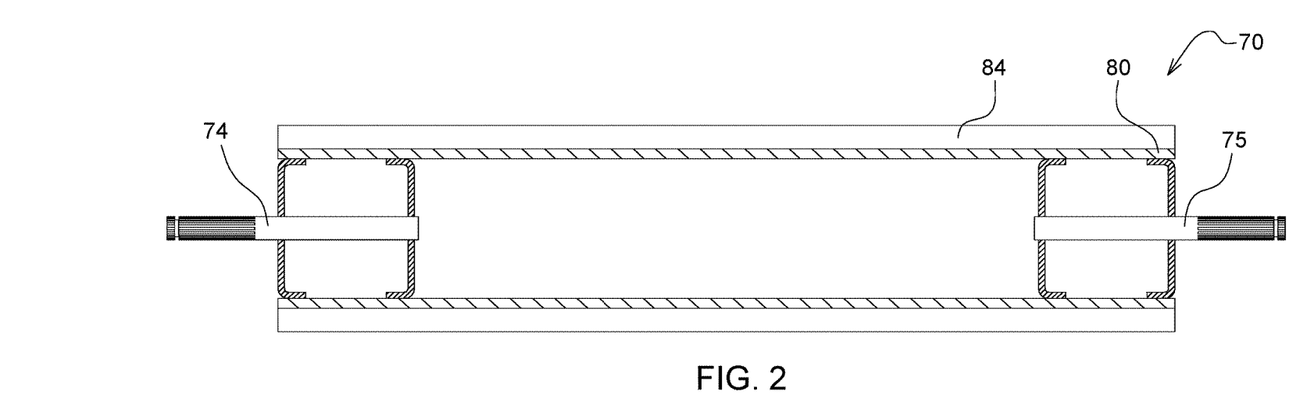
FIG. 2 is a partial side view of the cotton doffer structure of FIG. 1 according to one embodiment.
Figure 3:
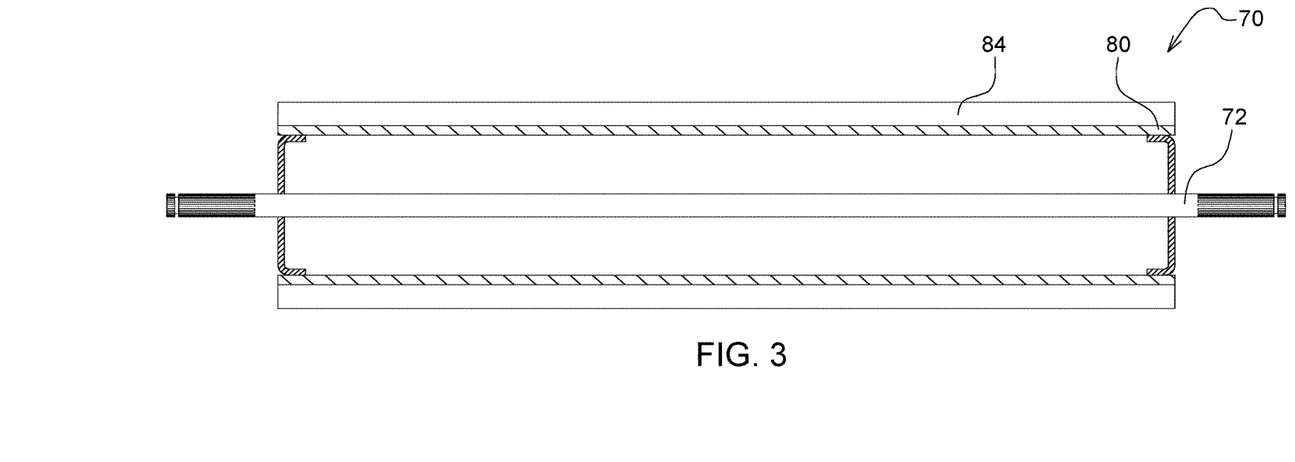
FIG. 3 is a partial side view of the cotton doffer structure of FIG. 1 according to another embodiment.

The cotton lint snagged on the toothed peripheries 38a and 50a of the primary and reclaimer saw cylinders 38, 50 is intercepted by a cotton doffer structure 70 coupled to a shaft 72 (FIG. 3) for rotation between the sidewalls 28 generally behind and between the primary and reclaimer saw cylinders 38, 50. Alternatively, the cotton doffer structure 70 may be coupled to a first stub shaft 74 and a second stub shaft 75 (FIG. 2). The cotton doffer structure 70 doffs the cotton from the primary and reclaimer saw cylinders 38, 50 and directs it into an upwardly directed airstream from a fan 76 and fan outlet duct 78. The cleaned cotton is directed through the outlet duct 26 back towards the accumulator. Further details of the cotton cleaner 10 and cotton conveying system may be had by reference to the aforementioned U.S. Pat. No. 4,606,177.

Figure 4:
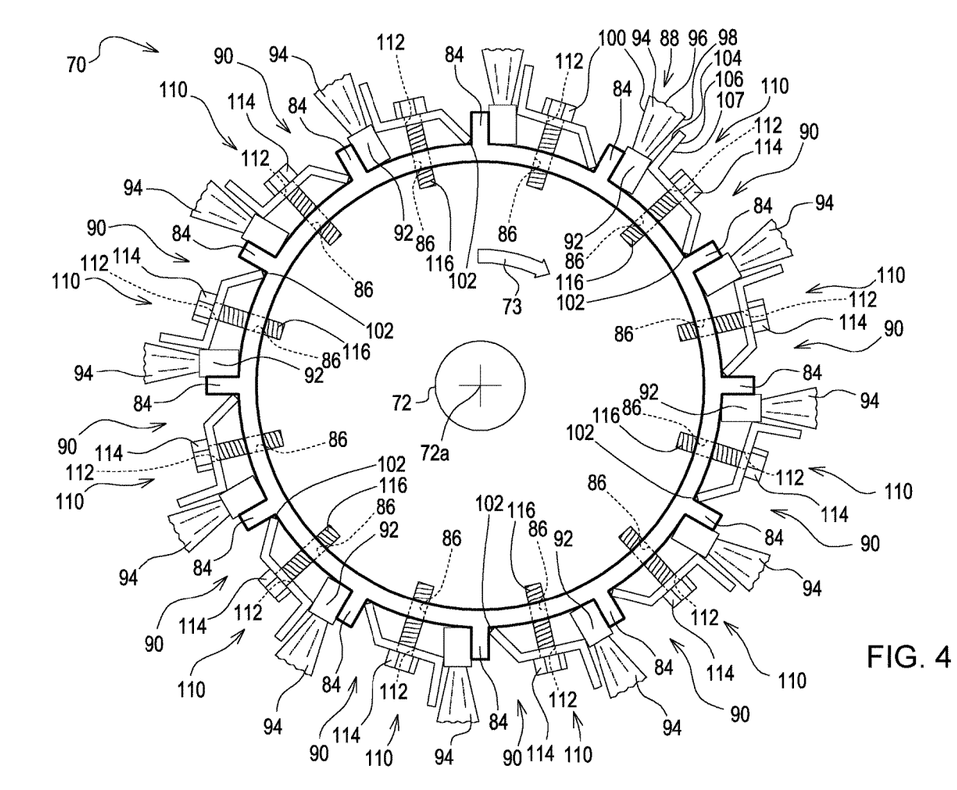
FIG. 4 is a zoomed in view of an end portion of the cotton doffer structure of FIG. 1 according to one embodiment.

With reference to FIG. 4, the cotton doffer structure 70 includes an extrusion 80 having a longitudinal axis 72a and a periphery 82 with a plurality of radial protrusions 84. A plurality of extrusion apertures 86 may be positioned between the plurality of radial protrusions 84. The shaft 72 is coupled to the extrusion 80 for rotation therewith about the longitudinal axis 72a in a forward direction 73.

A plurality of brushes 88 are coupled to the extrusion 80 with a plurality of brush support members 90. Each brush 88 includes a base end 92 that supports upstanding bristles 94. Each brush 88 has a distal end 96 opposite the base end 92. Each brush 88 also has a leading side 98, generally facing the forward direction 73, and an opposing trailing side 100.

The plurality of brush support members 90 each have a leading end 102 and a trailing end 104 with an upright flange 106. The plurality of brush support members 90 are provided to secure the base ends 92 of the plurality of brushes 88 against the protrusion 84 with the upright flange 106 located adjacent the leading side 98. An upper boundary 107 of the upright flange 106 projects above the base ends 92 forwardly of the bristles 94 thereby protecting the bristles 94 from damage when debris is encountered by the cotton doffer structure 70. The upright flange 106 also acts to dislodge debris from the plurality of brushes 88.

A plurality of fasteners 110 may be positioned through a brush support member aperture 112 of the brush support member 90 and the extrusion aperture 86 to secure the brush support members 90 to the extrusion 80. The plurality of fasteners 110 may be bolts 114 having threads 116 that protrude away from the periphery 82 preventing debris from accumulating on the fasteners 110.

Figure 5:
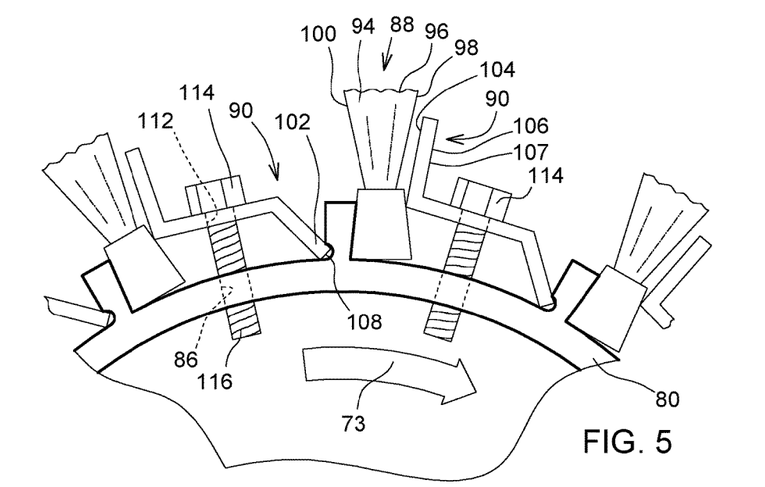
FIG. 5 is a zoomed in view of an end portion of the cotton doffer structure of FIG. 1 according to another embodiment.

Referring to FIG. 5, in one embodiment, the plurality of radial protrusions 84 may include a plurality of protrusion recesses 108 for receiving the leading end 102 of the plurality of brush support members 90. The plurality of protrusion recesses 108 help to secure the plurality of brush support members 90 that retain the plurality of brushes 88.

Figure 6:
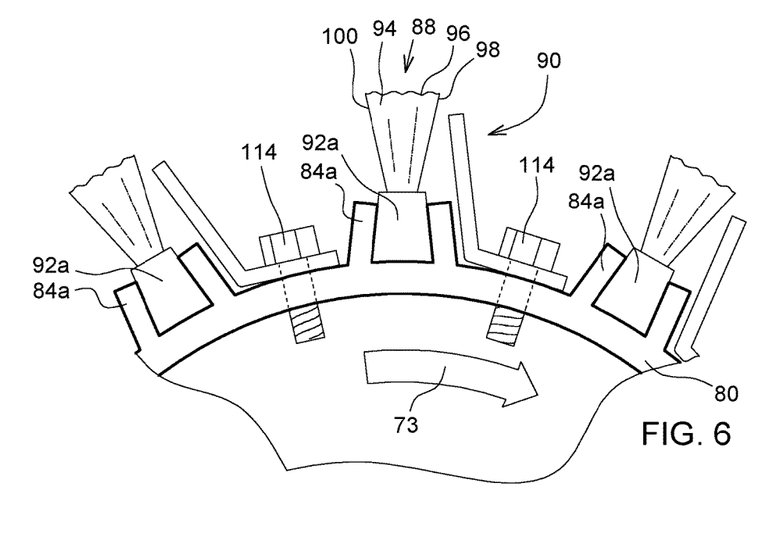
FIG. 6 is a zoomed in view of an end portion of the cotton doffer structure of FIG. 1 according to yet another embodiment.

With reference to FIG. 6, in another embodiment the radial protrusion 84a is dovetail shaped and receives the base end 92a that is opposingly dovetail shaped. The opposing dovetail shapes help to secure the base ends 92a to the extrusion 80.

In operation, the cotton doffer structure 70 has no exposed bolt threads to catch and carry plant residue which helps with trash separation and ease of service.

The extrusion 80 in the previous embodiments includes an entire rim of the cotton doffer structurer 70. Alternatively, due to manufacturers' capacity, the rim 81r may be formed by multiple extrusions 81 coupled together, cooperating to provide the rim 81r that has a longitudinal axis 72a and a periphery 82. The number of extrusions 81 can vary.

Figure 7:
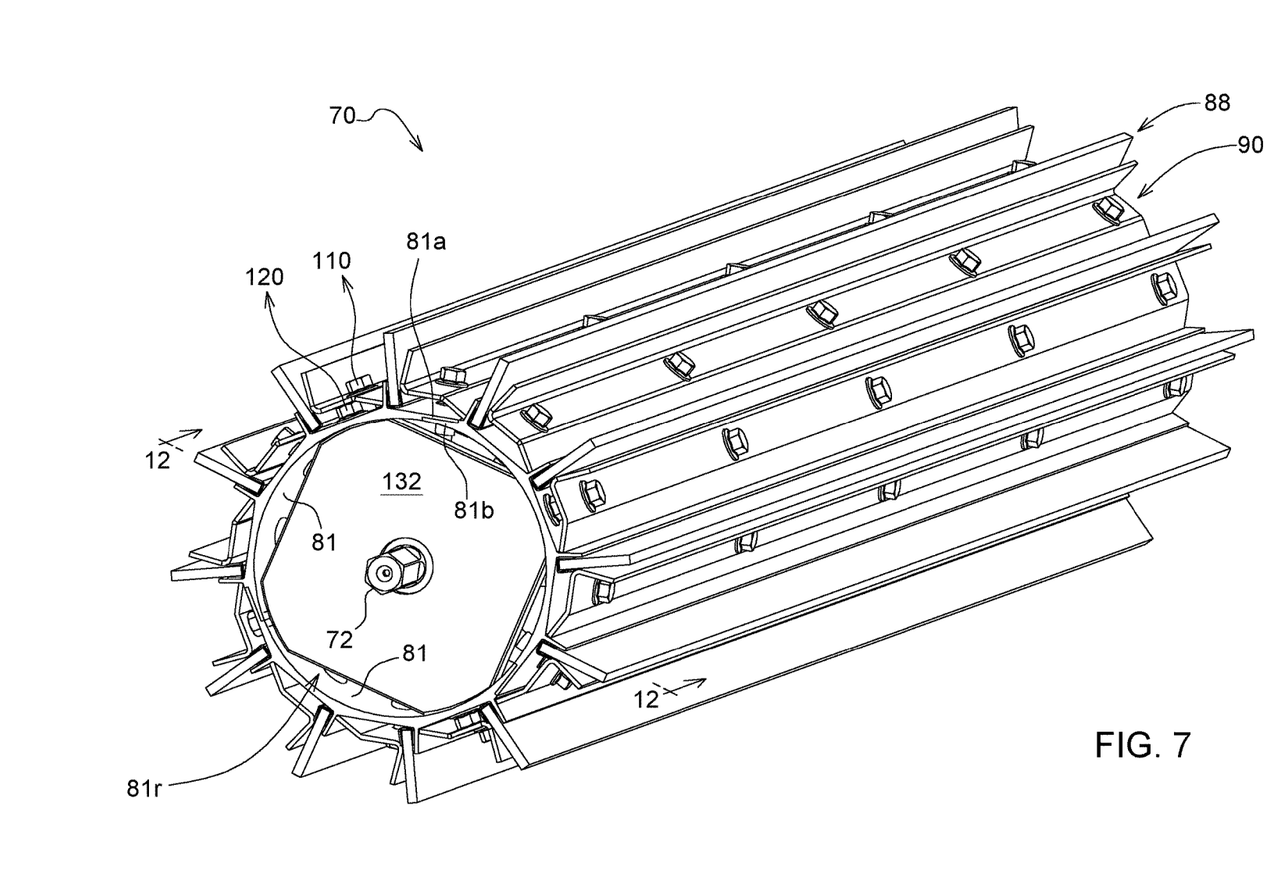
FIG. 7 is a perspective view of a cotton doffer structure according to another embodiment.
Figure 8:
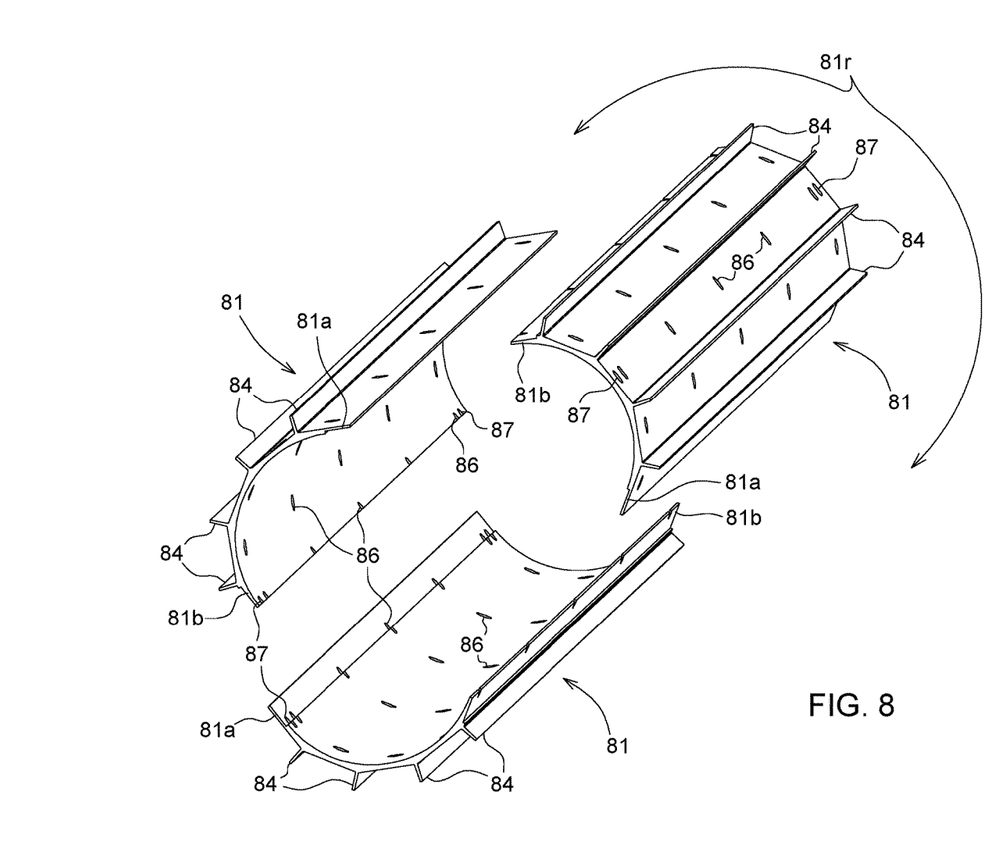
FIG. 8 is perspective view of three single-piece extrusions when they are not coupled to one another.
Figure 9:
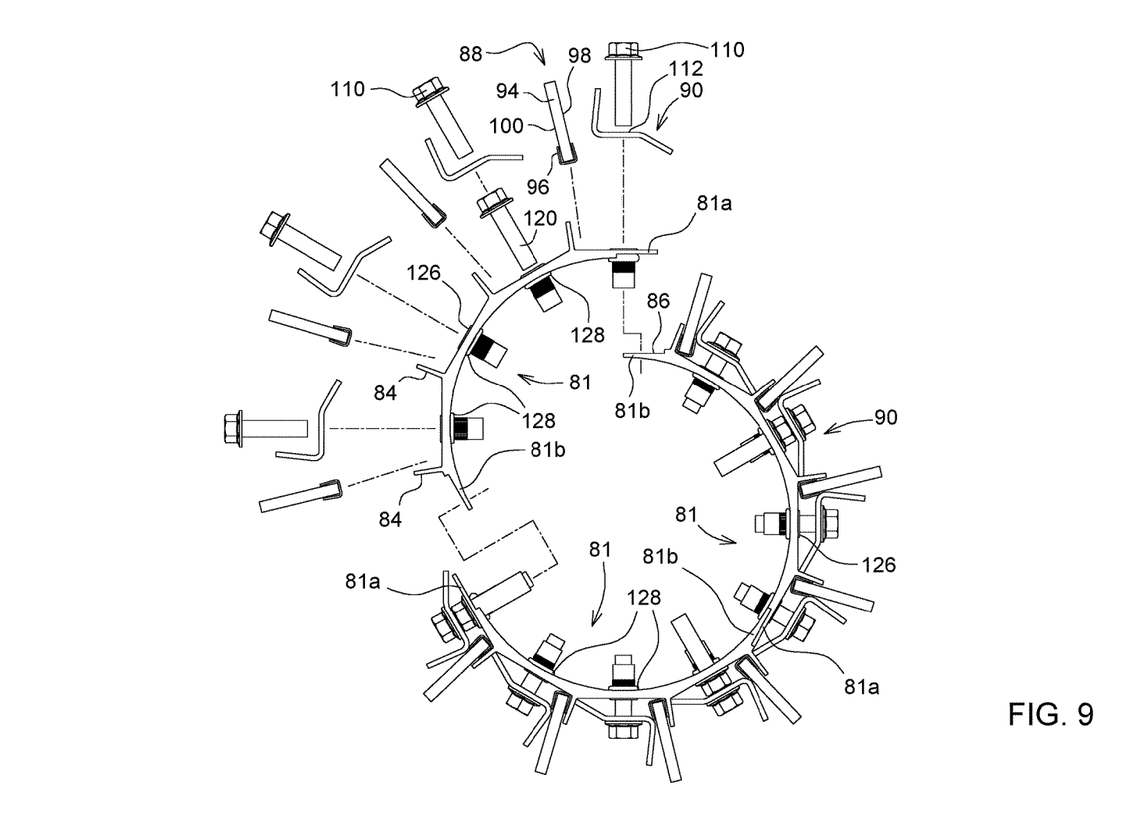
FIG. 9 is a partially exploded side view of the cotton doffer structure of FIG. 7.

FIGS. 7-9 demonstrate three single-piece extrusions 81, each of which is coupled to one another. The extrusions 81 cooperate to provide a rim 81r. The number of extrusions 81 may vary for a number of reasons, such as, for example, to accommodate a manufacturers' capacity to manufacture the cotton doffer structure 70.

The rim 81r has a longitudinal axis 72a and a periphery 82. Each of the single-piece extrusion 81 has two extensions 81a and 81b adjacent to its opposite edges. Fasteners 110 are positioned through the extrusion aperture 86 and a brush support member aperture 112 of a brush support member 90, securing a brush support member 90 to the single-piece extrusion 81. However, the extensions 81a and 81b of a single-piece extrusion 81 also include extrusion apertures 86. An extrusion aperture 86 of an extension 81a of a single-piece extrusion 81 corresponds to an extrusion aperture 86 of an extension 81b of the other one of single-piece extrusions 81 such that a fastener 110 is positioned through the two extrusion apertures 86 of different single-piece extrusions 81 and a brush support member aperture 112. The shape of the extrusion apertures 86 can vary and therefore is not limited to a round shape. The extension 81a contacts the extension 81b of one of the other single-piece extrusions 81 to form a lap joint. In this regard, not only the brush support member 90 is secured but also two of the single-piece extrusions 81 are successfully coupled to each other. In this embodiment, no extra fastener and extra extrusion aperture is needed to combine the single-piece extrusions 81. Alternatively, extra fasteners and extra extrusion apertures may be applied. In such a case, securing/fastening relationships between the brush support member and the rim 81r and between the extension 81a and extension 81b may be independent (not shown).

Figure 10A:
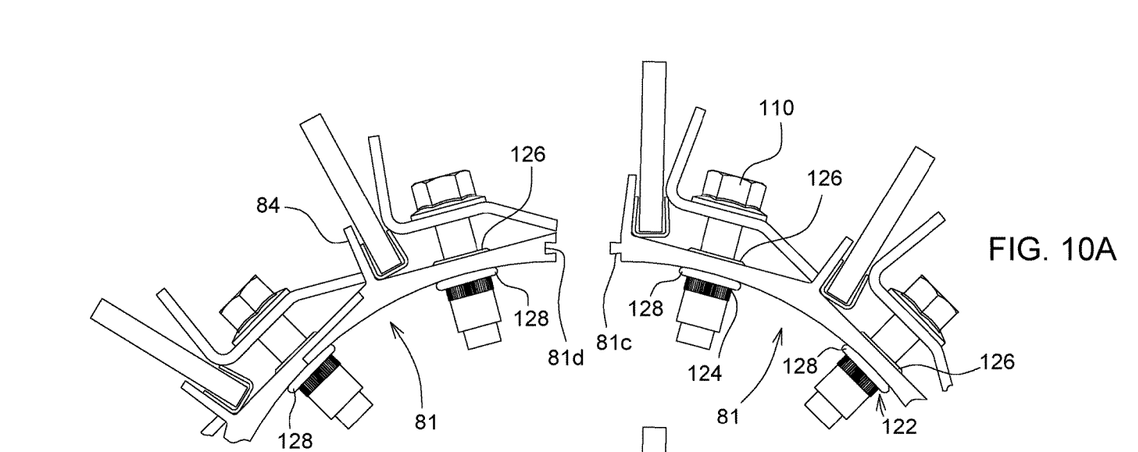
FIG. 10A is a zoomed in view of a tongue-in-groove connection between two single-piece extrusions according to another embodiment.
Figure 10B:
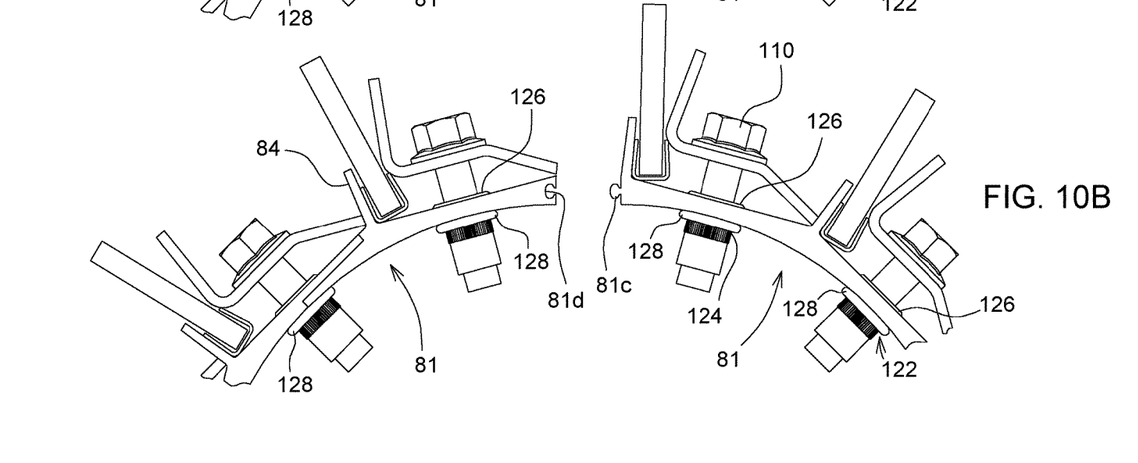
FIG. 10B is a zoomed in view of a tongue-in-groove connection between two single-piece extrusions according to another embodiment.

Alternatively, instead of coupling via extrusion apertures and fasteners, two single-piece extrusions 81 may interlock with each other via a tongue-in-groove connection. Referring to FIG. 10A, a single-piece extrusion 81 includes a protrusion 81c facing to the other single-piece extrusion 81. The other single-piece extrusion 81 includes a groove 81d to receive the protrusion 81c. In this configuration, the two single-piece extrusions 81 are joined together without a fastener. The protrusion 81c is dovetail-shaped and the groove 81d is opposingly dovetail-shaped. Referring to FIG. 10B, alternatively, the protrusion 81c and groove 81d have puzzle-piece profiles.

This configuration having multiple cooperating single-piece extrusions may be also applied to extrusions that have the radial protrusions extending outward from the periphery so as to form a plurality of dovetail-shaped recesses for receiving the base ends 92 of the brushes 86.

The fastener may be a rivet or bolt indirectly engaging with the extrusion aperture 86. Referring to FIGS. 9, 10A, 10B, 11, 12, a plurality of rings 122 are positioned in the extrusion apertures 86. An outer portion of each of the rings 122 is engaged with a respective one of the extrusion apertures 86. In this embodiment, each of the fasteners 110 is a cap screw with threads. In FIGS. 10A, 10B, and 12, the ring 122 may be rivnut (rivet nut). The outer portion of each of the rings 122 includes splines 124 engaged with the respective one of the extrusion apertures 86 to keep the ring 122 from spinning relative to the aperture 86. The ring 122/rivnut includes an aperture. The lower inner portion of the ring 122 has threads. Further, an upper end of each of the rings 122 includes a first flange 126. During assembling one of the rings 122, a second flange 128 is formed to sandwich a portion of the single-piece extrusion 81 adjacent to the extrusion aperture 86 with the first flange 126. The fastener 110 is threaded into the ring 122 to secure the brush support member 90. The rings 122 may also be applied to the extrusion apertures 86 of different extrusions 81 to couple two adjacent extrusions 81. Alternatively, without the ring 122, a weldnut or tapped hole can be applied to the extrusion aperture 86 for the fastener 110 to couple. Alternatively, the plurality of single-piece extrusions 81 can directly be welded to one another (not shown) to provide the rim 81r.

Referring to FIGS. 7 and 11-13, a first plate 132 and a second plate 136 are configured to couple the rim, the first stub shaft 74, and second stub shaft 75. The first plate 132 is positioned within the rim 81r and partially coupled adjacent to one end of the rim 81r, and the second plate 136 is positioned within the rim 81r and partially coupled adjacent to the other end of the rim 81r.

In this embodiment, four extrusion apertures 87 are positioned adjacent to each end of the rim. The first plate 132 includes four first arcuate edges 133, and the second plate 136 includes four second arcuate edges 137. The curvature radius of the first and second arcuate edges 133, 137 corresponds to the curvature radius of the internal portion(s) of the rim. Alternatively, the edges 133, 137 may have a number of different radii corresponding to a number of different radii of the internal portion(s) of the rim. Each first arcuate edge 133 has an engaging aperture 134, and each second arcuate edge 137 has an engaging aperture 138. Four fasteners 120 are positioned through the four extrusion apertures 87 adjacent to one end of the rim 81r and the four engaging apertures 134; another four fasteners 120 are positioned through the four extrusion apertures 87 adjacent to the other end of the rim 81r and the four engaging apertures 138. It is noted that the fasteners 120 can be threaded bolts, rivets, or any other type of fasteners to fasten the rim 81r and the first plate 132/second plate 136. The first plate 132 is coupled to the first stub shaft 74 and the second plate 136 is coupled to the second stub shaft 75.

Figure 11:
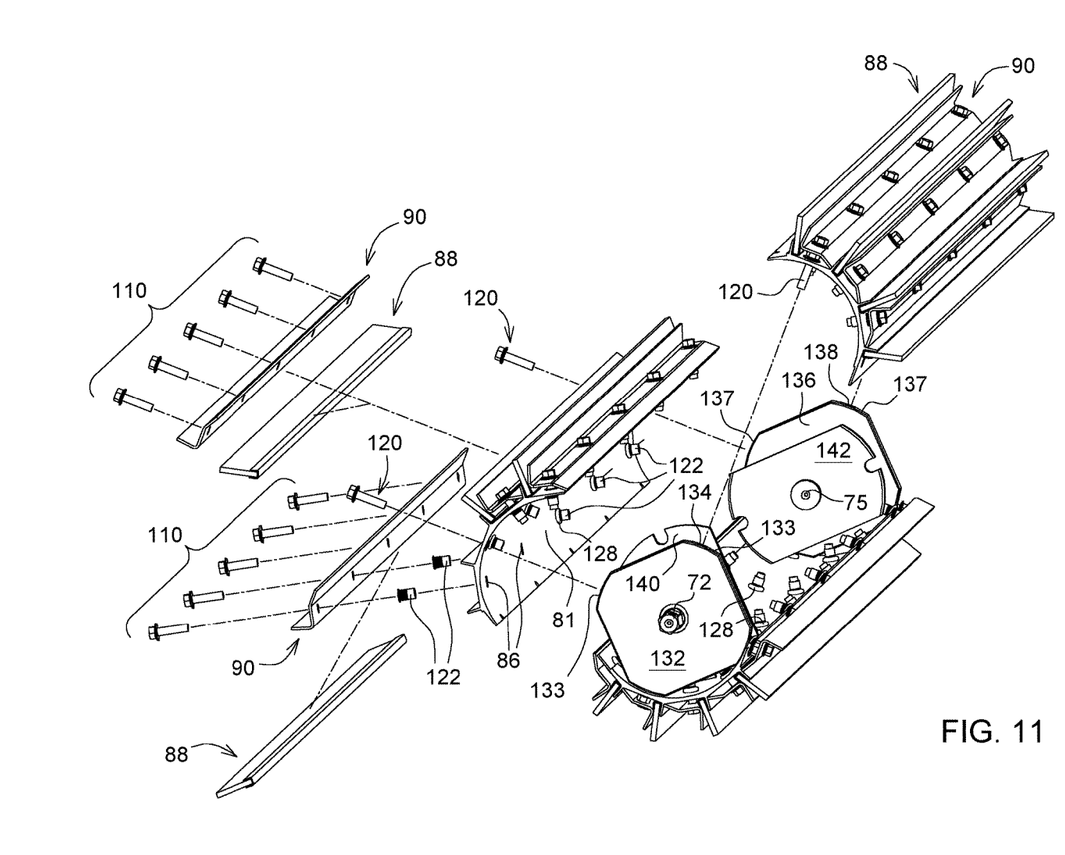
FIG. 11 is an exploded side view of the cotton doffer structurer of FIG. 7.
Figure 12:
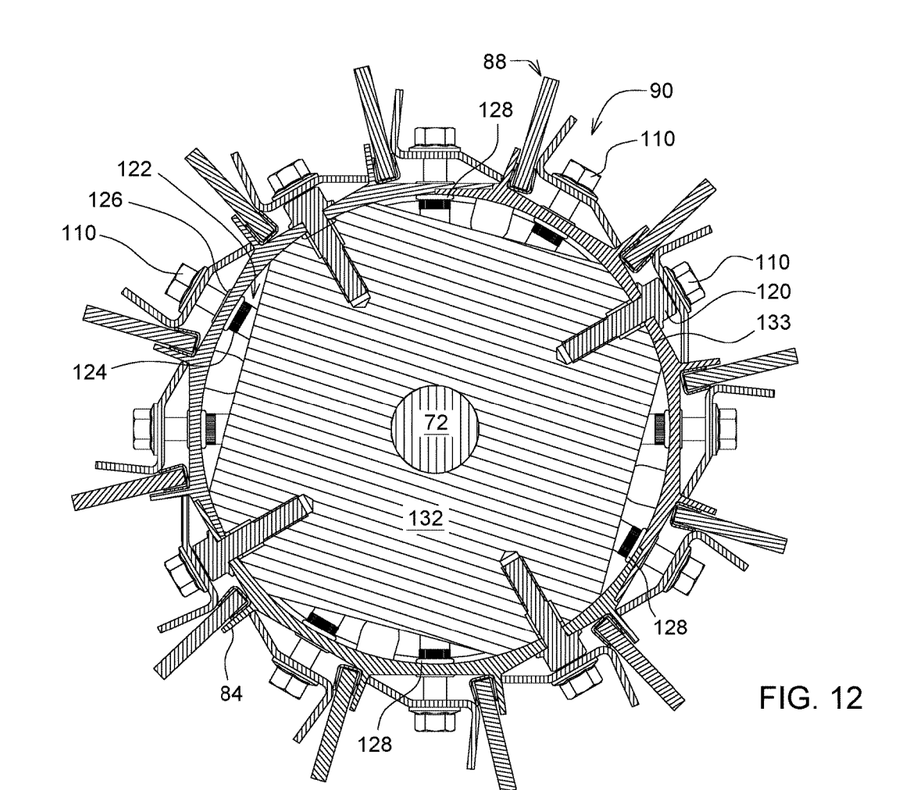
FIG. 12 is a cross-section view of FIG. 7.
Figure 13:
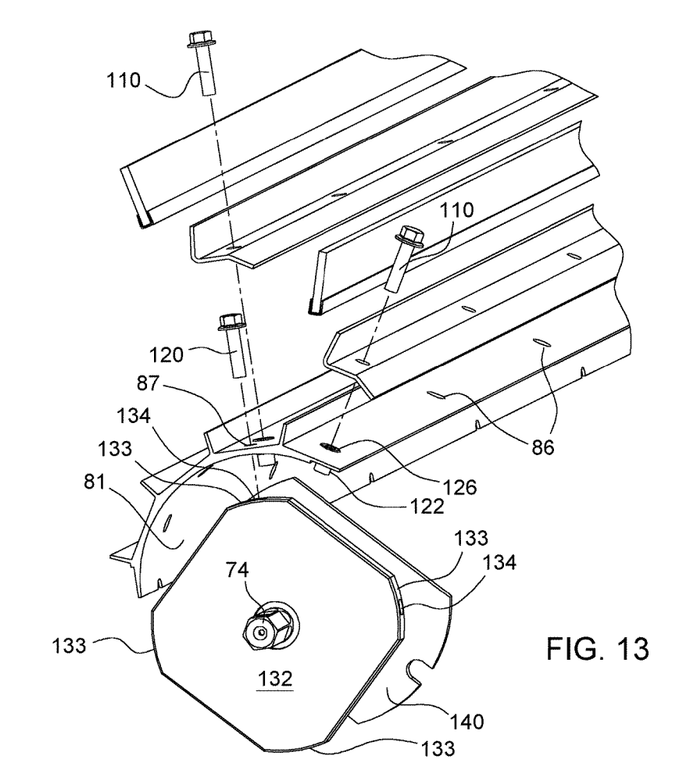
FIG. 13 is a zoomed exploded view of single-piece extrusion, rings, and fasteners of FIG. 7.

Referring to FIG. 11, a third plate 140 and a fourth plate 142 are illustrated. The third plate 140 is positioned on an inward portion of the first stub shaft 74 next to the first plate 132, and the fourth plate 142 is positioned on an inward portion of the second stub shaft 75 next to the second plate 136. In this embodiment, both of the third plate 140 and fourth plate 142 have two arcuate edges. Each of those arcuate edges has an opening in the middle thereof. The third and fourth plates 140,142 provide structural integrity when the first and second stub shafts 74, 75 are used to keep the first and second plates 132, 142 from deflecting under load. The arcuate edges of the third plate 140 and the arcuate edges of the fourth plate 142, in the axial direction along the longitudinal axis 72a, do not completely overlap.

Various features are set forth in the following claims.

What is claimed is:

1. A cotton doffer structure for doffing cotton snagged on a surface having debris, the cotton doffer structure comprising:
    a plurality of single-piece extrusions cooperating to provide a rim, the rim having a longitudinal axis and a periphery with a plurality of radial protrusions integrally extending outward from the periphery;
    a shaft coupled to the rim for rotation therewith about the longitudinal axis in a forward direction, the rim surrounding the shaft;
    a plurality of brushes, each brush having a base end supporting upstanding bristles, an opposing distal end, a leading side generally facing the forward direction, and an opposing trailing side; and
    a plurality of brush support members, each of the brush support members having a leading end and a trailing end with an upright flange, each of the plurality of brush support members securing a respective one of the base ends of the plurality of brushes against a respective one of the plurality of radial protrusions with the upright flange located adjacent the leading side.

2. The cotton doffer structure of claim 1, further comprising a plurality of extrusion apertures positioned between the plurality of radial protrusions and a plurality of fasteners positioned through a brush support member aperture of the brush support member and the extrusion aperture to secure the plurality of brush support members to the extrusion.

3. The cotton doffer structure of claim 2, wherein each of the fasteners is a bolt having threads that protrude away from the periphery preventing debris from accumulating on the fastener, the bolt further comprises a head, and each of the brush support members is sandwiched by one of the head and the periphery of the rim.

4. The cotton doffer structure of claim 2, comprising a plurality of rings positioned in the extrusion apertures, an outer portion of each of the rings engaged with a respective one of the extrusion apertures, each of the fasteners is a rivet partially engaged with an inner portion of each of the rings.

5. The cotton doffer structure of claim 4, wherein the outer portion of each of the rings comprises splines engaged with the respective one of the extrusion apertures.

6. The cotton doffer structure of claim 4, wherein an end of each of the rings comprises a flange contacting the periphery of the rim.

7. The cotton doffer structure of claim 1, comprising a first plate positioned within the rim and partially coupled adjacent to one end of the rim, and a second plate positioned within the rim and partially coupled adjacent to the other end of the rim,
wherein the shaft comprises a first stub shaft coupled to the first plate and a second stub shaft coupled to the second plate.

8. The cotton doffer structure of claim 7, wherein the first plate comprises first arcuate edges coupled to the rim and the second plate comprises second arcuate edges coupled to the rim, each of the first and second arcuate edges comprises at least one engaging aperture, the rim comprises a plurality of extrusion apertures each of which is fastened to one of the engaging apertures.

9. The cotton doffer structure of claim 1, wherein each of the single-piece extrusions comprises two extensions each of which contacts one of the extensions of one of the other single-piece extrusions to form a lap joint.

10. The cotton doffer structure of claim 1, wherein each of the single-piece extrusions interlocks with at least one of the other single-piece extrusions via a tongue-in-groove connection.

11. The cotton doffer structure of claim 1, wherein each of the single-piece extrusions includes more than one radial protrusion.

12. A cotton doffer structure for doffing cotton snagged on a surface having debris, the cotton doffer structure comprising:
a plurality of single-piece extrusions cooperating to provide a rim, the rim having a longitudinal axis and a periphery with a plurality of radial protrusions integrally extending outward from the periphery forming a plurality of dovetail-shaped recesses;
a shaft coupled to the rim for rotation therewith about the longitudinal axis in a forward direction, the rim surrounding the shaft;
a plurality of brushes, each brush having a dovetail-shaped base end supporting upstanding bristles and respectively received by one of the dovetail-shaped recesses, an opposing distal end, a leading side generally facing the forward direction, and an opposing trailing side; and
a plurality of brush support members, each of the brush support members having a leading end and a trailing end with an upright flange located adjacent the leading side.

13. The cotton doffer structure of claim 12, comprising a first plate positioned within the rim and partially coupled adjacent to one end of the rim, and a second plate positioned within the rim and partially coupled adjacent to the other end of the rim,
wherein the shaft comprises a first stub shaft coupled to the first plate and a second stub shaft coupled to the second plate.

14. The cotton doffer structurer of claim 13, wherein the first plate comprises first arcuate edges coupled to the rim and the second plate comprises second arcuate edges coupled to the rim, each of the first and second edges comprises at least one engaging aperture, the rim comprises a plurality of extrusion apertures each of which is fastened to one of the engaging apertures.

15. The cotton doffer structure of claim 12, wherein each of the single-piece extrusions comprises two extensions each of which contacts one of the extensions of one of the other single-piece extrusions to form a lap joint.

16. The cotton doffer structure of claim 12, wherein each of the single-piece extrusions interlocks with at least one of the other single-piece extrusions via a tongue-in-groove connection.

17. A method for assembling a cotton doffer structure that doffs cotton snagged on a surface having debris, the method comprising:
coupling a plurality of single-piece extrusions to provide a rim, each of the single-piece extrusions comprising a portion of the rim and a plurality of radial protrusions integrally extending outward from the portion of the rim;
coupling a shaft to the rim for rotation;
providing a plurality of brushes, each brush comprising a base end supporting upstanding bristles; and
securing the base ends of the plurality of brushes with a plurality of brush support members, each of the brush support members comprising a leading end and a trailing end with an upright flange, each of the plurality of brush support members securing a respective one of the base ends of the plurality of brushes against a respective one of the plurality of radial protrusions with the upright flange located adjacent the respective one of the base ends of the plurality of brushes.

18. The method of claim 17, comprising:
providing a plurality of extrusion apertures positioned between the plurality of radial protrusions, and a plurality of fasteners each of which is positioned through a respective one of brush support member apertures of the brush support members and a respective one of the extrusion apertures to secure the brush support members to the rim.

19. The method of claim 17, wherein the coupling the shaft to the rim comprising:
providing at least one plate coupled to the shaft and comprising arcuate edges, each of the arcuate edges comprising at least one engaging aperture;
fastening the rim and the at least one plate by a plurality of fasteners positioned through the engaging apertures and a plurality of extrusion apertures of the rim corresponding to the engaging apertures.

20. The method of claim 17, wherein the coupling the plurality of single-piece extrusions to provide the rim comprises:
forming a lap joint between two of the single-piece extrusions.

21. The method of claim 17, wherein the coupling the plurality of single-piece extrusions to provide the rim comprises:
interlocking a protrusion and a groove of two of the single-piece extrusions.

22. A cotton doffer structure for doffing cotton snagged on a surface having debris, the cotton doffer structure comprising:
- a plurality of single-piece segments cooperating to provide a rim, the rim having a longitudinal axis and a periphery with a plurality of radial protrusions integrally extending outward from the periphery;
- a shaft coupled to the rim for rotation therewith about the longitudinal axis in a forward direction, the rim surrounding the shaft;
- a plurality of brushes, each brush having a base end supporting upstanding bristles and contacting the periphery of the rim, an opposing distal end, a leading side generally facing the forward direction, and an opposing trailing side; and
- a plurality of brush support members, each of the brush support members having a leading end and a trailing end with an upright flange, each of the plurality of brush support members securing a respective one of the base ends of the plurality of brushes against a respective one of the plurality of radial protrusions with the upright flange located adjacent the leading side.

\* \* \* \* \*